US005661244A

United States Patent [19]
Nishimura et al.

[11] Patent Number: 5,661,244
[45] Date of Patent: Aug. 26, 1997

[54] PRESSURE SENSOR

[75] Inventors: Etsuo Nishimura; Tateki Mitani, both of Hyogo, Japan

[73] Assignee: Mitsubishi Denki Kabushiki Kaisha, Tokyo, Japan

[21] Appl. No.: 408,294

[22] Filed: Mar. 22, 1995

[30] Foreign Application Priority Data

Oct. 5, 1994 [JP] Japan .................. 6-241696

[51] Int. Cl.$^6$ .................................. G01L 9/04
[52] U.S. Cl. ................... 73/706; 73/721; 73/727
[58] Field of Search ................ 73/706, 756, 721, 73/727, 753, 754

[56] References Cited

U.S. PATENT DOCUMENTS

| 4,019,388 | 4/1977 | Hall, II et al. ............... 73/398 AR |
| 4,413,527 | 11/1983 | Sugiura et al. ................. 73/754 |
| 4,499,774 | 2/1985 | Tsuchiya et al. ............... 73/727 |
| 4,562,742 | 1/1986 | Bell ............................... 73/718 |
| 4,759,227 | 7/1988 | Timmons ....................... 73/863.23 |
| 4,978,438 | 12/1990 | Shimanune et al. ........... 204/265 |
| 5,101,665 | 4/1992 | Mizuno .......................... 73/721 |
| 5,128,540 | 7/1992 | Stieff ............................. 250/255 |

FOREIGN PATENT DOCUMENTS

| 225501A | 3/1984 | Germany . |
| 3436440A | 4/1984 | Germany . |
| 62-169032 | 7/1987 | Japan ............................ G01L 9/00 |
| 62-207923 | 9/1987 | Japan ............................ G01L 9/04 |
| 62-285031 | 12/1987 | Japan ............................ G01L 7/00 |
| 64-16946 | 1/1989 | Japan ............................ G01L 19/00 |
| 3-239937 | 10/1991 | Japan . |
| 5-52687 | 3/1993 | Japan . |
| 5-52688 | 3/1993 | Japan ............................ G01L 9/04 |
| 5-52690 | 3/1993 | Japan . |
| 6-281519 | 10/1994 | Japan . |

*Primary Examiner*—Richard Chilcot
*Assistant Examiner*—Paul D. Amrozowicz
*Attorney, Agent, or Firm*—Sughrue, Mion, Zinn, Macpeak & Seas

[57] ABSTRACT

In a pressure sensor, a metallic pressure introducing pipe is fit into the pressure receiving inlet formed in a metallic housing and fixed there by welding. The housing has a flange portion in its upper portion, and the flange portion is fixed to the outer wall of a tank which is an object to be measured so that the pressure sensor body is located inside the tank. A porous filter made of fluoroplastics is arranged adjacently to the atmospheric pressure introducing inlet. An adhesive tape which is removable is attached to the atmospheric pressure introducing inlet. The pressure sensor can realize stabilized maintenance and highly reliable airtightness for a sensor element, less limitation to sensor layout design in a small space and also can surely introduce air with no drop of water and dust into the sensor.

9 Claims, 2 Drawing Sheets

PRESSURE SENSOR

BACKGROUND OF THE INVENTION

The present invention mainly relates to a pressure sensor for measuring the internal pressure of, mainly, a fuel tank of an internal combustion engine.

FIG. 4 is a sectional view of the conventional pressure sensor proposed in Unexamined Japanese Patent Publication (Kokai) Hei-5-52688. In FIG. 4, a pressure sensor element 1 serves to convert a pressure introduced from a pressure introducing pipe 1a into an electrical signal, and is connected to a lead pin 1b, a relay terminal 2 and a circuit board 3. An O-ring 5 is mounted between a stem member 4 and the pressure introducing pipe 1a of the sensor. A disk-shaped spacer 6, through which the pressure introducing pipe 1a passes, is mounted between the sensor element 1 and the O-ring 5. Incidentally, the pressure sensor further includes a sealing ring 7, a holding plate 8 having a hole 8a, and a screw 9 for fixing the sensor element 1 through the holding plate 8.

The pressure sensor having the above structure intends to assure airtightness between the sensor-pressure introducing pipe and a housing by the O-ring.

In the prior art pressure sensor, which has the above structure, there was a problem that airtightness is not assured because of poor surface precision of the sealing surface of the housing, intrusion of foreign particles thereinto in inserting the pressure introducing pipe 1a into the housing to assemble the pressure sensor, or hardening and elasticity reduction of the O-ring at low temperatures. There was also another problem that signal abnormality due to heat and residual stress is produced in fixing the sensor element to the housing by welding. There was a further problem that airtightness is not assured also when the pressure introducing pipe of the sensor and the center axis of the O-ring mounted portion of the housing are not coaxial. There was a still further problem that where the internal pressure within a tank is measured by the pressure sensor mounted in the tank, because the pressure sensor body projects from the outer wall of the tank, layout design in a small space is limited. There was a yet further problem that when air or atmosphere is introduced in the pressure sensor, drops of water and dust are also introduced so that the interior of the sensor is polluted.

SUMMARY OF THE INVENTION

An object of the present invention is to provide a pressure sensor which can give stabilized installation and highly reliable airtightness for a sensor element, less limitation to sensor layout design in a small space and also can surely introduce air with no drop of water and dust into the sensor.

In the pressure sensor according to the present invention, a pressure receiving inlet for introducing a pressure medium is attached to a metallic housing and the end of a pressure introducing pipe set in the housing is fit into the pressure receiving inlet and fixed there by welding.

In the pressure sensor, a flange portion is provided in the upper portion of the housing, and the flange portion is fixed the outer wall of a tank which is an object to be measured, the pressure sensor body is arranged inside the tank.

In the pressure sensor, a porous filter made of fluoroplastics is arranged adjacently to the atmospheric pressure introducing inlet.

In the pressure sensor, an adhesive tape which is removable is attached to the atmospheric pressure introducing inlet.

In accordance with the present invention, since the portion where the pressure introducing pipe is fit into the pressure receiving inlet of the metallic housing is fixed by welding, stabilized installation for the sensor element and high airtightness within the housing can be attained.

Since the flange portion is provided in the upper portion of the housing, the pressure sensor can be so installed that it does not project from the outer wall of the tank. Therefore, the pressure sensor can be provided with less limitation to sensor layout design in a small space.

Since the porous filter made of fluoroplastics is arranged adjacently to the atmospheric pressure introducing inlet, when the atmospheric pressure is introduced into the pressure sensor, dust and drops of water in the air are trapped by the filter. Therefore, the pressure sensor with highly reliable dust-and-water proof can be obtained.

Since the adhesive tape which is removable is attached to the atmospheric pressure introducing inlet, inexpensive and sure dust/water proof effects can be given to a pressure sensor which is not still used.

The above and other objects and features of the present invention will be more apparent from the following description taken in conjunction with the accompanying drawings.

DESCRIPTION OF THE PREFERRED EMBODIMENT

Figure 1:
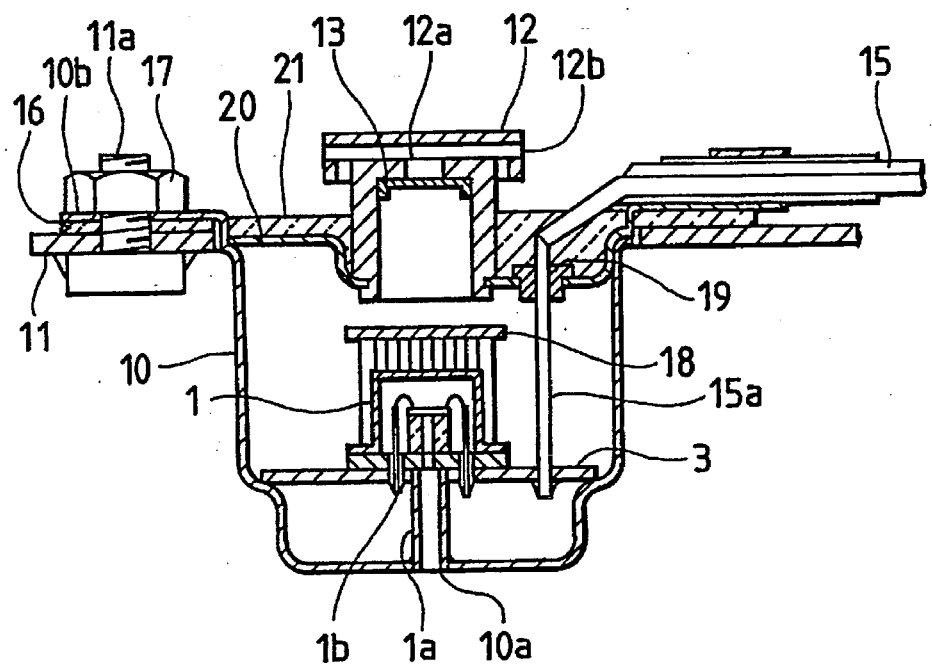
FIG. 1 is a sectional view of a pressure sensor according to one embodiment of the present invention in a state where it is attached to a tank.
Figure 2:
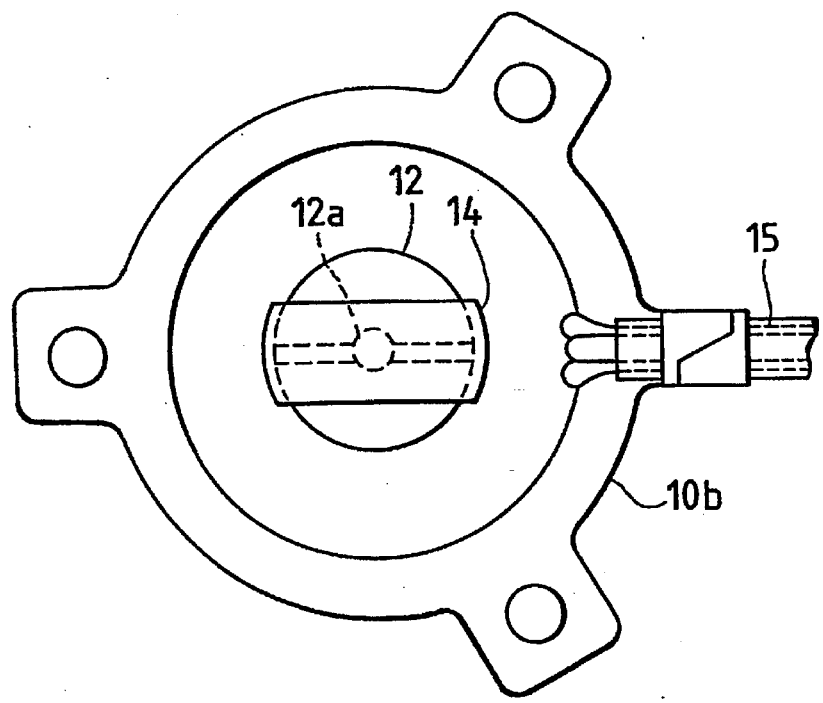
FIG. 2 is a plan view of the pressure sensor according to the one embodiment of the present invention.
Figure 3:
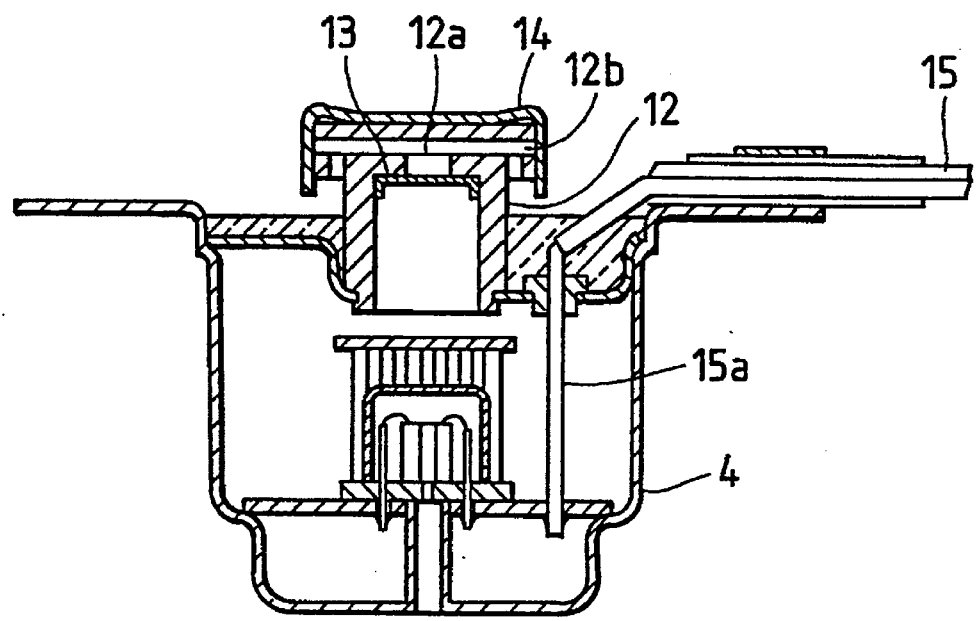
FIG. 3 is a sectional view of the pressure sensor according to the present invention.
Figure 4:
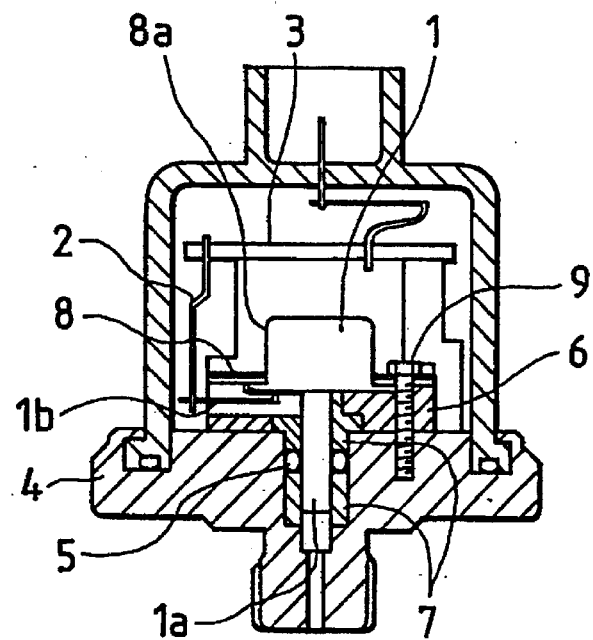
FIG. 4 is a sectional view of the prior art pressure sensor.

Now referring to FIGS. 1 to 3, an explanation will be given of an embodiment of the pressure sensor according to the present invention. In FIGS. 1 to 3, like reference numerals refer to like parts in FIG. 4 showing the prior art.

In FIGS. 1 to 3, reference numeral 1 denotes a semiconductor pressure sensor element; 1a a pressure introducing pipe; 1b a lead pin for supplying an electric signal from the pressure sensor element 1 to a circuit board 3; and 10 a metallic housing for housing internal components, the housing being made of e.g. metal for deep drawing and manufactured by deep-drawing stamping. Reference numeral 10a denotes a pressure receiving inlet formed in the metallic housing 10; and 10b a flange portion for installing a sensor to the outer wall 11 of a tank, the flange portion being attached to the outer wall 11 by e.g. a welding bolt 11a. Reference numeral 12 denotes a molding member which includes an atmospheric pressure introducing path 12a and an atmospheric pressure introducing inlet 12b on the outer surface. Reference numeral 13 denotes a filter located on the atmospheric pressure introducing path 12a; 14 an adhesive tape bonded to the atmospheric pressure introducing inlet; 15 a lead wire; 15a a lead wire core line portion from a circuit board to a feedthrough capacitor 19; 16 a gasket for making the inside of a tank airtight; 17 a nut; 18 a hybrid IC; 20 a metallic cover; and 21 a potting material.

The pressure sensor having the components described above, as shown in FIG. 1, is attached to the tank by the welding bolt 11a attached to the outer wall of the tank and the nut 17 through the gasket 16. The pressure sensor element 1 soldered to the circuit board 3 senses a pressure signal and the hybrid IC 18 attached to the same circuit board amplifies the sensed pressure signal. The amplified pressure signal passes through the feedthrough capacitor 19 from the circuit board 3 via the lead wire core line portion 15a. The pressure signal is outputted from the lead wire 15. The pressure introducing pipe 1a of the sensor is fixed to the pressure receiving inlet 10a of the metallic housing 10 by welding. The welding includes plasma arc welding and laser welding. Brazing, inclusive of soldering, can also attain the same effect.

On the outside of the metallic cover 20, the mold member 12 having the air introducing path 12a and the feedthrough capacitor 19 are arranged. The outer surface of the metallic cover 20 is fixed by a potting member 21 of e.g. thermo-setting resin, compound room-temperature setting resin, or RTV rubber so that the inside of the pressure sensor is made airtight. To the atmospheric pressure introducing path 12a, the porous filter 13 made of fluoroplastics is fixed for dust/water proof by heat-melting and adhesive.

Moreover, as shown in FIG. 2, an adhesive tape 14 which is easily removable is attached to the mold member 12 having an air introducing inlet 12b.

Further, as shown in FIG. 3, the adhesive tape 14 shown in FIG. 2 is bonded to the atmospheric pressure introducing inlet 12b formed on the side of the mold member 12 to make a dust proof structure.

What is claimed is:

1. A pressure sensor for measuring an internal pressure in a fuel tank, comprising:

a metallic housing having a pressure receiving inlet for introducing pressure medium;

a cover for keeping airtightness within the housing;

an atmospheric pressure introducing inlet attached to the cover;

a metallic pressure introducing pipe provided within the housing, the end thereof being fit into the pressure receiving inlet and fixed by welding;

a circuit board provided within the housing;

a pressure sensor element, attached to the circuit board, for converting a difference between a pressure introduced from the atmospheric pressure introducing inlet and a pressure introduced from the pressure introducing pipe into an electric signal, and an amplifying section, attached to the circuit board, for amplifying the electric signal from the pressure sensor element;

wherein a vertical center axis of the pressure sensor element and a center axis of the amplifying section are in coaxial arrangement on the circuit board.

2. A pressure sensor according to claim 1, wherein said housing has a flange portion on its one end, and the flange portion is fixed to the outer wall of a tank which is an object to be measured so that the pressure sensor is located inside the tank.

3. A pressure sensor according to claim 1, wherein a porous filter made of fluoroplastics is arranged adjacently to the atmospheric pressure introducing inlet.

4. A pressure sensor according to claim 2, wherein a porous filter made of fluoroplastics is arranged adjacently to the atmospheric pressure introducing inlet.

5. A pressure sensor according to claim 1, wherein an adhesive tape which is removable is attached to said atmospheric pressure introducing inlet.

6. A pressure sensor according to claim 2, wherein an adhesive tape which is removable is attached to said atmospheric pressure introducing inlet.

7. A pressure sensor according to claim 3, wherein an adhesive tape which is removable is attached to said atmospheric pressure introducing inlet.

8. A pressure sensor according to claim 4, wherein an adhesive tape which is removable is attached to said atmospheric pressure introducing inlet.

9. A pressure sensor according to claim 1, wherein said welding to fix the metallic pressure introducing pipe with the pressure receiving inlet is selected from plasma arc welding, laser welding, brazing, and soldering.

\* \* \* \* \*